US012616307B2

(12) United States Patent

Gasser

(10) Patent No.: US 12,616,307 B2

(45) Date of Patent: May 5, 2026

(54) CHAIR HAVING REAR HANDLE ASSEMBLY

(71) Applicant: Gasser Chair Co., Inc., Youngstown, OH (US)

(72) Inventor: Greg Gasser, Youngstown, OH (US)

(73) Assignee: Gasser Chair Co., Inc., Youngstown, OH (US)

( * ) Notice: Subject to any disclaimer, the term of this patent is extended or adjusted under 35 U.S.C. 154(b) by 144 days.

(21) Appl. No.: 18/477,864

(22) Filed: Sep. 29, 2023

(65) Prior Publication Data

US 2025/0107627 A1 Apr. 3, 2025

(51) Int. Cl.
*A47C 1/04* (2006.01)
*A47C 1/11* (2006.01)
*A47C 7/62* (2006.01)
*B60N 3/02* (2006.01)

(52) U.S. Cl.
CPC .................. *A47C 7/62* (2013.01); *A47C 1/04* (2013.01); *A47C 1/11* (2013.01); *B60N 3/02* (2013.01)

(58) Field of Classification Search
CPC .... A47C 7/62; A47C 1/06; A47C 1/11; A47C 1/04; B60N 3/02
See application file for complete search history.

(56) References Cited

U.S. PATENT DOCUMENTS

| | | | |
|---|---|---|---|
| 1,220,642 A | 3/1917 | Edwin | |
| 1,885,630 A | 11/1932 | Ronan | |
| D91,861 S | 4/1934 | Darbyshire | |
| D126,551 S | 4/1941 | Borchers | |
| D155,471 S | 10/1949 | Aleks | |
| D165,702 S | 1/1952 | Stewart | |
| D171,521 S | 2/1954 | Taffae | |
| D189,525 S | 1/1961 | Huggins | |
| 2,985,228 A * | 5/1961 | Golden | A47C 1/06 297/410 |
| 3,145,050 A * | 8/1964 | Edwards | B60N 3/026 74/DIG. 10 |

(Continued)

FOREIGN PATENT DOCUMENTS

| | | | | |
|---|---|---|---|---|
| CH | 715319 A2 * | 3/2020 | | B60N 2/242 |
| CN | 102745108 A * | 10/2012 | | |

(Continued)

OTHER PUBLICATIONS

AMI Refrigerator Door Handle, posted Jun. 27, 2019 [online], [retrieved Apr. 21, 2025], retrieved from internet, http://www.amazon.com/218428101-Refreigerator-Replacement-Compatible-Frigidaire/dp/B07TNNY56Q/ref=sr_1_5? (Year: 2019).

(Continued)

*Primary Examiner* — Timothy J Brindley

(74) *Attorney, Agent, or Firm* — Sand, Sebolt & Wernow Co., LPA

(57) ABSTRACT

A chair with a vertically oriented handle, or just a handle that is to be installed in a vertical orientation on a chair, is provided. The handle has an ergonomic design and is aesthetically pleasing. The handle shape ergonomically conforms to a natural curve to provide better support and reduce strain during transportation. The handle is located centrally relative to a centerline to maintain or reduce the center of gravity of the chair which provides better stability during transportation.

21 Claims, 8 Drawing Sheets

(56) References Cited

U.S. PATENT DOCUMENTS

| | | | |
|---|---|---|---|
| D201,876 | S | 8/1965 | Gasser |
| D205,692 | S | 9/1966 | Sundberg et al. |
| D208,055 | S | 7/1967 | Durfee et al. |
| D212,182 | S | 9/1968 | D'Elia et al. |
| 3,512,187 | A | 5/1970 | Morton et al. |
| D217,712 | S | 6/1970 | Kamins et al. |
| 3,556,591 | A | 1/1971 | Smith |
| 3,764,180 | A | 10/1973 | Mulholland |
| 3,786,887 | A | 1/1974 | Matsuoka et al. |
| 3,877,725 | A | 4/1975 | Barroza |
| 3,907,363 | A | 9/1975 | Baker et al. |
| 4,026,509 | A | 5/1977 | Wolters |
| 4,076,201 | A | 2/1978 | Hudnall |
| 4,128,217 | A | 12/1978 | Mazelsky |
| D255,184 | S | 6/1980 | Locher |
| 4,229,039 | A | 10/1980 | Day |
| 4,291,913 | A | 9/1981 | Kowalski |
| 4,337,977 | A | 7/1982 | Rogers, Jr. et al. |
| 4,352,523 | A | 10/1982 | Holobaugh, Jr. |
| 4,379,588 | A | 4/1983 | Speice |
| 4,556,253 | A | 12/1985 | Geneve et al. |
| 4,732,423 | A | 3/1988 | Condon |
| D297,890 | S | 10/1988 | Hockenberry et al. |
| 4,775,184 | A | 10/1988 | Larkin |
| 4,819,903 | A | 4/1989 | Jimenez |
| 4,838,547 | A | 6/1989 | Sterling |
| 4,867,445 | A | 9/1989 | Connelly |
| 4,930,842 | A | 6/1990 | Wilkinson et al. |
| 4,938,603 | A | 7/1990 | Turner et al. |
| D315,836 | S | 4/1991 | Kaiser |
| 5,044,633 | A | 9/1991 | Rice |
| 5,066,069 | A | 11/1991 | Degelder |
| 5,102,192 | A | 4/1992 | Barile, Sr. |
| D326,372 | S | 5/1992 | Edwards |
| 5,163,188 | A | 11/1992 | Munroe |
| D333,733 | S | 3/1993 | Sammons |
| 5,190,349 | A | 3/1993 | Austin, Jr. et al. |
| 5,236,244 | A | 8/1993 | Rice |
| 5,244,254 | A | 9/1993 | Irwin |
| D341,045 | S | 11/1993 | Barile |
| 5,257,851 | A | 11/1993 | Kanaya |
| D342,436 | S | 12/1993 | Cook et al. |
| 5,267,778 | A | 12/1993 | Krebs et al. |
| D344,195 | S | 2/1994 | Hare |
| D345,477 | S | 3/1994 | Infanti |
| 5,301,964 | A | 4/1994 | Papac |
| D347,334 | S | 5/1994 | Fewchuk |
| 5,320,415 | A | 6/1994 | Krebs |
| 5,371,990 | A | 12/1994 | SalahUddin |
| D354,176 | S | 1/1995 | Schwaegerle et al. |
| 5,383,585 | A * | 1/1995 | Weiss .................... B62B 7/12 |
| | | | 280/30 |
| 5,445,174 | A | 8/1995 | Cunningham |
| 5,527,095 | A | 6/1996 | Marshall et al. |
| 5,542,748 | A | 8/1996 | Barile |
| D374,805 | S | 10/1996 | Moffatt et al. |
| 5,638,806 | A | 6/1997 | Foust |
| 5,662,345 | A | 9/1997 | Kiewit |
| 5,697,196 | A | 12/1997 | Salahuddin |
| 5,706,613 | A | 1/1998 | Drake, Jr. et al. |
| 5,782,528 | A | 7/1998 | Cioncada |
| 5,871,258 | A | 2/1999 | Battey et al. |
| 5,887,946 | A | 3/1999 | Raftery |
| D411,699 | S | 6/1999 | Bond et al. |
| 5,909,923 | A | 6/1999 | Dekraker |
| 5,927,799 | A | 7/1999 | Tornero |
| 5,975,627 | A | 11/1999 | Lapointe et al. |
| 5,975,634 | A | 11/1999 | Teppo et al. |
| 5,979,984 | A | 11/1999 | Dekraker et al. |
| 5,988,746 | A | 11/1999 | Raftery |
| 5,992,930 | A | 11/1999 | Lapointe et al. |
| D421,187 | S | 2/2000 | Kaiser |
| 6,030,037 | A | 2/2000 | Ritch et al. |
| 6,074,306 | A | 6/2000 | Behringer |
| 6,086,153 | A | 7/2000 | Heidmann et al. |
| 6,089,593 | A | 7/2000 | Blyshak et al. |
| 6,113,189 | A * | 9/2000 | Bennett ............... A61G 5/1067 |
| | | | 297/376 |
| 6,116,695 | A | 9/2000 | Heidmann et al. |
| D433,855 | S | 11/2000 | Turner et al. |
| 6,142,566 | A | 11/2000 | Ritch et al. |
| 6,142,570 | A | 11/2000 | Bergsten et al. |
| 6,145,924 | A | 11/2000 | Mero, Jr. et al. |
| D441,557 | S | 5/2001 | Glass |
| D444,636 | S | 7/2001 | Ooyama |
| 6,345,835 | B1 | 2/2002 | Watkins |
| 6,385,481 | B2 | 5/2002 | Nose et al. |
| 6,435,538 | B2 | 8/2002 | Ellis et al. |
| D469,621 | S * | 2/2003 | Kita ............................. D6/380 |
| 6,536,079 | B2 | 3/2003 | Hill |
| D474,358 | S * | 5/2003 | Kita .......................... D6/716.4 |
| D477,926 | S | 8/2003 | Haney et al. |
| 6,644,675 | B2 | 11/2003 | Ellis et al. |
| 6,702,051 | B2 | 3/2004 | Chu et al. |
| D492,182 | S | 6/2004 | Roseman |
| 6,786,496 | B2 * | 9/2004 | Ward ...................... A61G 5/10 |
| | | | 297/423.25 |
| 6,799,798 | B1 * | 10/2004 | Mandart ................. B60N 2/24 |
| | | | 297/183.6 |
| 6,846,042 | B2 | 1/2005 | Blyshak et al. |
| D502,013 | S | 2/2005 | Kaiser |
| D502,014 | S | 2/2005 | Kaiser |
| 6,905,171 | B2 | 6/2005 | Teppo et al. |
| 6,913,315 | B2 | 7/2005 | Ball et al. |
| D507,893 | S | 8/2005 | Glass et al. |
| 6,932,430 | B2 | 8/2005 | Bedford et al. |
| 6,974,189 | B2 | 12/2005 | Michael et al. |
| 6,986,177 | B2 | 1/2006 | Thaxton |
| 6,991,291 | B2 | 1/2006 | Knoblock et al. |
| D517,357 | S | 3/2006 | Gasser |
| D520,768 | S | 5/2006 | Glass et al. |
| D520,782 | S | 5/2006 | Glass et al. |
| 7,040,709 | B2 | 5/2006 | Knoblock et al. |
| 7,040,711 | B2 | 5/2006 | Dekraker et al. |
| 7,052,083 | B2 | 5/2006 | Peitz et al. |
| D522,776 | S * | 6/2006 | Williams ................. D6/716.4 |
| 7,070,233 | B2 | 7/2006 | Laffin |
| 7,114,777 | B2 | 10/2006 | Knoblock et al. |
| 7,131,225 | B2 | 11/2006 | Wu |
| 7,131,700 | B2 | 11/2006 | Knoblock et al. |
| 7,163,228 | B2 | 1/2007 | Faber |
| D536,548 | S | 2/2007 | Peitz et al. |
| D536,554 | S | 2/2007 | True |
| D541,069 | S | 4/2007 | Peitz et al. |
| 7,216,880 | B2 | 5/2007 | Laffin |
| 7,234,777 | B2 | 6/2007 | Schweikarth et al. |
| D551,881 | S | 10/2007 | True |
| D552,445 | S | 10/2007 | Cybulski et al. |
| 7,275,272 | B2 | 10/2007 | Gallan |
| D562,020 | S | 2/2008 | Massaud |
| 7,328,942 | B1 | 2/2008 | Wu |
| 7,350,324 | B2 | 4/2008 | Wu |
| 7,357,574 | B2 | 4/2008 | Matsumoto et al. |
| D573,804 | S | 7/2008 | Bartlmae |
| 7,427,105 | B2 | 9/2008 | Knoblock et al. |
| 7,478,880 | B2 | 1/2009 | Johnson et al. |
| 7,523,993 | B1 * | 4/2009 | Daneault ............... B60N 2/242 |
| | | | 244/118.6 |
| D593,139 | S | 5/2009 | Cline et al. |
| 7,559,105 | B2 | 7/2009 | Thaxton |
| 7,568,760 | B1 | 8/2009 | Lodes |
| D599,129 | S | 9/2009 | Opsvik |
| D603,193 | S | 11/2009 | Sandoval |
| D603,616 | S | 11/2009 | Kubryk |
| D610,595 | S | 2/2010 | Baker et al. |
| 7,676,862 | B2 | 3/2010 | Poulos et al. |
| D614,416 | S | 4/2010 | Garzon |
| 7,712,834 | B2 | 5/2010 | Knoblock et al. |
| 7,740,315 | B2 | 6/2010 | Ball et al. |
| 7,832,799 | B2 | 11/2010 | Davis, Jr. et al. |
| D646,513 | S | 10/2011 | Mezzera |
| D646,514 | S | 10/2011 | Vong |
| D646,515 | S | 10/2011 | Vong |
| 8,056,160 | B2 | 11/2011 | Poulos et al. |

(56) References Cited

U.S. PATENT DOCUMENTS

| | | | |
|---|---|---|---|
| 8,096,621 B2 * | 1/2012 | Braun | B60N 2/682 |
| | | | 297/440.16 |
| 8,118,120 B2 | 2/2012 | Flowers et al. | |
| D656,328 S | 3/2012 | Samuel et al. | |
| D662,183 S | 6/2012 | Sieger | |
| D663,974 S | 7/2012 | Swy | |
| D665,183 S | 8/2012 | Welsh | |
| 8,353,560 B2 | 1/2013 | Grove | |
| D679,512 S | 4/2013 | Lade | |
| D680,763 S | 4/2013 | Ouchi | |
| D681,353 S | 5/2013 | Lade | |
| D683,558 S | 6/2013 | Rada et al. | |
| 8,454,088 B2 | 6/2013 | Shokouhi | |
| D686,858 S | 7/2013 | Fletcher | |
| 8,602,500 B1 | 12/2013 | Warren | |
| 8,622,409 B2 | 1/2014 | Hector, Jr. et al. | |
| D701,054 S | 3/2014 | Lee | |
| 8,677,520 B2 | 3/2014 | Storm | |
| D714,366 S | 9/2014 | Jeon et al. | |
| 8,888,118 B2 | 11/2014 | Paul et al. | |
| 8,919,797 B2 | 12/2014 | Lowenthal et al. | |
| 8,939,509 B2 | 1/2015 | Ni | |
| D722,625 S | 2/2015 | Cho et al. | |
| 8,967,635 B2 | 3/2015 | Paul et al. | |
| 8,979,185 B1 | 3/2015 | Redel | |
| 8,979,207 B2 | 3/2015 | Bachar | |
| 9,016,706 B2 | 4/2015 | Paul et al. | |
| 9,016,739 B2 | 4/2015 | Mondano et al. | |
| D729,563 S | 5/2015 | Kubryk | |
| D730,095 S | 5/2015 | Fletcher | |
| 9,022,462 B2 | 5/2015 | Johnson et al. | |
| 9,033,349 B2 | 5/2015 | Graves et al. | |
| D731,220 S | 6/2015 | Fletcher | |
| 9,084,710 B2 | 7/2015 | Paul et al. | |
| 9,095,483 B2 | 8/2015 | Storm | |
| 9,149,122 B1 | 10/2015 | Jannetides et al. | |
| 9,155,393 B2 | 10/2015 | Hurford et al. | |
| 9,156,335 B1 * | 10/2015 | Harter | E05B 85/10 |
| 9,172,782 B2 | 10/2015 | Baschnagel | |
| D742,128 S | 11/2015 | Mick | |
| D743,180 S | 11/2015 | Mehaffey et al. | |
| 9,193,286 B2 | 11/2015 | Okuyama et al. | |
| 9,198,514 B2 | 12/2015 | Machael et al. | |
| 9,198,814 B2 | 12/2015 | Paul et al. | |
| 9,380,879 B2 | 7/2016 | Hector et al. | |
| 9,394,054 B2 | 7/2016 | Johnson et al. | |
| 9,486,385 B1 | 11/2016 | Terrill | |
| 9,521,908 B1 | 12/2016 | Beck et al. | |
| 9,527,519 B1 | 12/2016 | Shokouhi | |
| 9,532,912 B2 | 1/2017 | Loewenthal et al. | |
| 9,637,035 B2 | 5/2017 | Abe et al. | |
| 9,648,957 B2 | 5/2017 | Su | |
| 9,743,773 B2 | 8/2017 | Machael et al. | |
| D806,513 S | 1/2018 | Curic et al. | |
| D811,790 S | 3/2018 | Chavarria | |
| 9,955,785 B2 | 5/2018 | Voigt et al. | |
| 9,962,305 B2 | 5/2018 | Yamada et al. | |
| D826,026 S | 8/2018 | Chubb et al. | |
| D828,139 S | 9/2018 | Rizzi et al. | |
| 10,064,692 B2 | 9/2018 | Nakanishi et al. | |
| 10,065,073 B2 | 9/2018 | Wheeler | |
| 10,076,214 B2 | 9/2018 | Goh Aow | |
| D829,458 S | 10/2018 | Abadie et al. | |
| 10,086,733 B2 * | 10/2018 | Lee | B60N 3/02 |
| 10,206,541 B2 | 2/2019 | Mccaffery | |
| 10,232,209 B2 | 3/2019 | Pouchet | |
| 10,267,453 B2 | 4/2019 | Casagrande | |
| D847,549 S | 5/2019 | Abadie et al. | |
| 10,299,601 B2 | 5/2019 | Speicher et al. | |
| 10,390,668 B1 * | 8/2019 | Ryder | A47K 17/028 |
| D861,405 S | 10/2019 | Abadie | |
| 10,448,742 B2 | 10/2019 | Machael et al. | |
| 10,548,434 B2 | 2/2020 | Mccaffery | |
| D879,526 S | 3/2020 | Abadie et al. | |
| 10,595,684 B2 | 3/2020 | Mccaffery | |
| 10,751,235 B2 | 8/2020 | Ernst | |
| D894,621 S * | 9/2020 | Morrison | D6/356 |
| 10,801,665 B2 | 10/2020 | Casagrande | |
| 10,806,650 B2 | 10/2020 | Di Lauro et al. | |
| D900,494 S | 11/2020 | Tsai | |
| D903,349 S * | 12/2020 | Kanstorf | B60N 3/02 |
| | | | D6/356 |
| D909,112 S | 2/2021 | Abadie | |
| 10,919,425 B1 * | 2/2021 | Kondrad | B60N 2/682 |
| 11,071,396 B2 | 7/2021 | Pujol | |
| 11,084,585 B2 * | 8/2021 | Jolley | B60R 7/10 |
| 11,089,910 B2 | 8/2021 | Mccaffery | |
| D933,383 S | 10/2021 | Wang | |
| 11,134,809 B2 | 10/2021 | Mccaffery | |
| D936,403 S | 11/2021 | Abadie et al. | |
| 11,161,004 B2 | 11/2021 | Lee | |
| D943,298 S | 2/2022 | Abadie | |
| D953,760 S | 6/2022 | Wu | |
| D965,319 S | 10/2022 | Wu | |
| D965,648 S | 10/2022 | Kim et al. | |
| 11,510,495 B1 * | 11/2022 | Machin | A47C 7/42 |
| D977,854 S | 2/2023 | Abadie | |
| 11,612,247 B1 | 3/2023 | Rusch | |
| 11,628,106 B1 * | 4/2023 | Chitalu | A61H 7/007 |
| | | | 601/99 |
| 11,633,322 B1 | 4/2023 | Harden et al. | |
| 11,634,195 B1 | 4/2023 | Dupuis et al. | |
| 11,634,909 B2 | 4/2023 | Cramer | |
| D1,008,679 S | 12/2023 | Yang | |
| D1,008,680 S | 12/2023 | Yang | |
| D1,012,527 S | 1/2024 | Wu | |
| D1,064,690 S | 3/2025 | Gasser | |
| 2001/0040358 A1 | 11/2001 | Ellis et al. | |
| 2001/0043003 A1 | 11/2001 | Teppo et al. | |
| 2002/0014751 A1 | 2/2002 | Blyshak et al. | |
| 2002/0017809 A1 | 2/2002 | Roossien et al. | |
| 2002/0053822 A1 | 5/2002 | Ware et al. | |
| 2002/0116846 A1 | 8/2002 | Wu | |
| 2002/0139374 A1 | 10/2002 | Iliff et al. | |
| 2002/0174516 A1 | 11/2002 | Hill | |
| 2002/0180183 A1 | 12/2002 | Ellis et al. | |
| 2003/0015853 A1 | 1/2003 | Blyshak et al. | |
| 2003/0015902 A1 | 1/2003 | Teppo et al. | |
| 2003/0047982 A1 | 3/2003 | Ball et al. | |
| 2003/0075960 A1 | 4/2003 | Wilkerson et al. | |
| 2003/0140953 A1 | 7/2003 | Kersey, Jr. | |
| 2003/0173807 A1 | 9/2003 | Rossien et al. | |
| 2003/0193227 A1 | 10/2003 | Dekraker et al. | |
| 2003/0196356 A1 | 10/2003 | Wu | |
| 2003/0197412 A1 | 10/2003 | Zazzara, Sr. | |
| 2004/0004385 A1 | 1/2004 | Lee | |
| 2004/0007400 A1 | 1/2004 | Chu et al. | |
| 2004/0007401 A1 | 1/2004 | Chu et al. | |
| 2004/0046432 A1 | 3/2004 | Ball et al. | |
| 2004/0130195 A1 | 7/2004 | Dekraker et al. | |
| 2004/0245827 A1 | 12/2004 | Bedford et al. | |
| 2005/0006878 A1 | 1/2005 | Laffin | |
| 2005/0022301 A1 | 2/2005 | Thaxton | |
| 2005/0039302 A1 | 2/2005 | Laffin | |
| 2005/0046254 A1 | 3/2005 | Knoblock et al. | |
| 2005/0093354 A1 | 5/2005 | Ball et al. | |
| 2005/0127729 A1 | 6/2005 | Knoblock et al. | |
| 2005/0146191 A1 | 7/2005 | Machael et al. | |
| 2005/0179292 A1 | 8/2005 | Knoblock et al. | |
| 2005/0206209 A1 | 9/2005 | Schweikarth et al. | |
| 2005/0231013 A1 | 10/2005 | Knoblock et al. | |
| 2005/0242651 A1 | 11/2005 | Peitz et al. | |
| 2006/0016014 A1 | 1/2006 | Thaxton | |
| 2006/0059621 A1 | 3/2006 | Poulos et al. | |
| 2006/0101568 A1 | 5/2006 | Gallan | |
| 2006/0202529 A1 | 9/2006 | Johnson et al. | |
| 2006/0210021 A1 | 9/2006 | Matsumoto et al. | |
| 2006/0232046 A1 | 10/2006 | Faber | |
| 2007/0024098 A1 | 2/2007 | Knoblock et al. | |
| 2007/0057549 A1 | 3/2007 | Ball et al. | |
| 2008/0054698 A1 | 3/2008 | Klemm et al. | |
| 2009/0001793 A1 | 1/2009 | Knoblock et al. | |
| 2010/0019551 A1 | 1/2010 | Oviedo | |
| 2010/0031433 A1 | 2/2010 | Storm | |

(56)  References Cited

U.S. PATENT DOCUMENTS

| | | |
|---|---|---|
| 2010/0107335 A1 | 5/2010 | Poulos et al. |
| 2010/0126793 A1 | 5/2010 | Flowers et al. |
| 2010/0222190 A1 | 9/2010 | Miskech |
| 2010/0225086 A1 | 9/2010 | Hector, Jr. et al. |
| 2011/0227314 A1 | 9/2011 | Lowenthal et al. |
| 2012/0030870 A1 | 2/2012 | Storm |
| 2012/0153588 A1 | 6/2012 | Shokouhi |
| 2013/0140779 A1 | 6/2013 | Paul et al. |
| 2013/0140780 A1 | 6/2013 | Graves et al. |
| 2013/0140782 A1 | 6/2013 | Paul et al. |
| 2013/0140783 A1 | 6/2013 | Paul et al. |
| 2013/0140788 A1 | 6/2013 | Paul et al. |
| 2013/0140789 A1 | 6/2013 | Paul et al. |
| 2013/0313883 A1 | 11/2013 | Machael et al. |
| 2014/0252830 A1 | 9/2014 | Johnson et al. |
| 2014/0306503 A1 | 10/2014 | Ni |
| 2014/0312668 A1 | 10/2014 | Hurford et al. |
| 2015/0015008 A1 | 1/2015 | Mondano et al. |
| 2015/0157518 A1 | 6/2015 | Loewenthal et al. |
| 2015/0181008 A1 | 6/2015 | Baschnagel |
| 2015/0232185 A1 | 8/2015 | Johnson et al. |
| 2015/0238015 A1 | 8/2015 | Hector et al. |
| 2016/0025264 A1 | 1/2016 | Casagrande |
| 2016/0073784 A1 | 3/2016 | Machael et al. |
| 2016/0199238 A1 | 7/2016 | Yamada et al. |
| 2016/0287936 A1 | 10/2016 | Wheeler |
| 2017/0079438 A1 | 3/2017 | Speicher et al. |
| 2017/0165014 A1 | 6/2017 | Nakanishi et al. |
| 2017/0232289 A1 | 8/2017 | Pouchet |
| 2018/0008100 A1 | 1/2018 | Mccaffery |
| 2018/0008511 A1 | 1/2018 | Mccaffery |
| 2018/0042429 A1 | 2/2018 | Mccaffery |
| 2018/0199721 A1 | 7/2018 | Machael et al. |
| 2018/0296411 A1 | 10/2018 | Ernst |
| 2019/0201258 A1 | 7/2019 | Di Lauro et al. |
| 2019/0242521 A1 | 8/2019 | Casagrande |
| 2019/0307295 A1 | 10/2019 | Mccaffery |
| 2019/0314005 A1 | 10/2019 | Ishihara et al. |
| 2020/0030054 A1 | 1/2020 | Okawara |
| 2020/0128970 A1 | 4/2020 | Pujol |
| 2020/0197741 A1 | 6/2020 | Lee |
| 2022/0378644 A1 * | 12/2022 | Maruyama ............... A61H 1/00 |

FOREIGN PATENT DOCUMENTS

| | | | | |
|---|---|---|---|---|
| CN | 205273512 U | * | 6/2016 | |
| DE | 202019000091 U1 | * | 5/2019 | |
| EP | 008893457 | | 3/2022 | |
| EP | 015097117 | | 3/2025 | |
| GB | 90047468873-0005 | | 3/2018 | |
| GB | 8101900000-4000 | | 5/2018 | |
| GB | 9005801255-0015 | | 10/2018 | |
| JP | 2008265581 A | * | 11/2008 | ............... B60N 3/02 |
| KR | 19980042181 U | * | 9/1998 | |
| KR | 0135119 Y1 | * | 1/1999 | |
| KR | 20100006773 U | * | 7/2010 | |
| KR | 20120002735 U | * | 4/2012 | |
| KR | 20160061674 A | * | 6/2016 | |
| WO | WO D101900-001 | | 5/2018 | |
| WO | WO-2021048045 A1 | * | 3/2021 | ............. B60N 2/242 |

OTHER PUBLICATIONS

BlytheM Bar Stool, posted Nov. 20, 2023 [online], [retrieved Apr. 21, 2025], retrieved from internet, http://www.amazon.com/dp/BOCNPWY947/ref=sbl_dpx_living-room-chairs_B09VNVLZ3H_00? (Year: 2023).

Ermnois Bar Stool, posted Jun. 6, 2023 [online], [retrieved Apr. 21, 2025]. retrieved from internet, http://www.amazon.com/Ermnois-Counter-Barstools-Adjustable-Armless/dp/B0C77QGJ8M/ref=sr_1_7? (Year: 2023).

YaFiti Bar Stool, posted Mar. 20, 2024 [online], [retrieved Apr. 21, 2025], retrieved from internet, http://www.amazon.com/gp/aw/d/BOCYLSVJMG/? (Year: 2024).

Manhattan Swivel Chair, no posting date available [online], [retrieved Apr. 21, 2025], retrieved from internet, http://www.amazon.com/dp/B092JPHP98/ref=sbl_dpx_living-room-chairs_B09VNLZ3H_00? (Year: 2025).

* cited by examiner

FIG.1

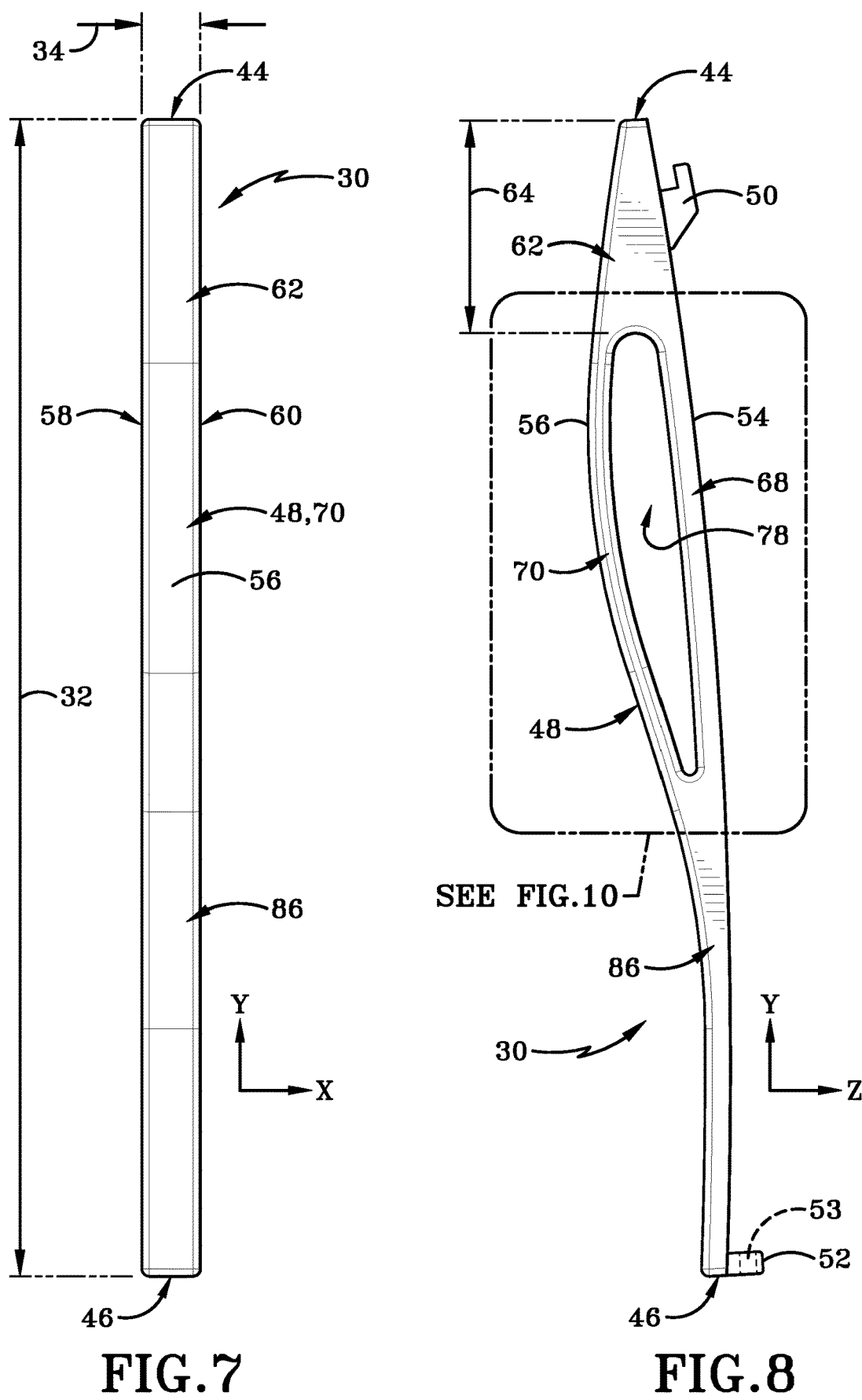
FIG.7             FIG.8

CHAIR HAVING REAR HANDLE ASSEMBLY

TECHNICAL FIELD

This disclosure is directed to a chair having a handle, and a handle for a chair.

BACKGROUND ART

Handles on chairs serve a practical purpose by providing assistance in moving the chair from one location to another. They are particularly useful in situations where chairs need to be frequently rearranged or transported, such as in conference rooms, event venues, casinos, or dining areas.

Generally, the inclusion of handles on chairs offers several benefits. One exemplary benefit is that handles provide easy mobility that allow users to lift and carry the chair. By providing a designated gripping point, handles enable individuals to maintain a secure and comfortable grip and ensuring better control while moving the chair. Another exemplary benefit is that handles allow for efficient transportation inasmuch as chairs with handles can be moved more quickly and efficiently, making it easier for users to set up or rearrange seating arrangements. This is especially valuable in busy environments where time is of the essence, such as during events or in spaces with high turnover. Another exemplary benefit is enhanced safety in that handles on chairs provide a secure gripping point, minimizing the risk of accidental dropping or loss of control during transportation. This helps prevent potential injuries or damage to the chair itself, as a secure hold reduces the chances of the chair slipping or falling.

Despite their usefulness, some handles on chairs may be insufficient due to various reasons. For example, regarding ergonomics, some handles that are poorly designed or located in inconvenient positions may cause discomfort or strain when lifting and carrying the chair. If the handle is aligned in a non-ergonomic manner, too small, lacks padding, or has sharp edges, it can result in discomfort, blisters, or even injuries to the user's hands. Regarding durability, some handles may be made from materials that are not sufficiently durable, leading to wear and tear over time. If the handle is not robust enough or poorly attached to the chair frame, it may break or detach, rendering it ineffective and potentially causing accidents. Regarding aesthetics and space considerations, in certain settings, chairs with handles may be preferred to have a more streamlined or aesthetically pleasing appearance. Bulky or protruding handles can detract from the overall design of the chair and make it challenging to stack or store them efficiently.

SUMMARY OF THE INVENTION

What is needed is an chair with a handle that has an ergonomic design and is aesthetically pleasing. The present disclosure addresses this need by providing a chair with a rear handle assembly that is vertically oriented. The vertically oriented handle has a contoured shapes to reduce pressure on the hands and promote a more natural grip. An ergonomic handle shape conforms to the hand's natural curve to provide better support and reduce strain during transportation. The handle may be formed from high-quality, durable materials to ensure that the handle can withstand frequent use and maintain their integrity over time. Strong and resilient materials, such as reinforced plastics or metal alloys, could be utilized to enhance the handle's durability and longevity.

In one aspect, an exemplary embodiment of the present disclosure may provide a chair comprising: a seat adapted to be sat upon; a seat back having an upper end and a lower end defining a vertical direction therebetween, and the seat back having a first side and a second side defining a lateral direction therebetween, and the seat back having a front surface and a rear surface defining a transverse direction therebetween; a handle on the rear surface of the seat back, wherein the handle includes a length dimension that is oriented in the vertical direction, a width dimension that is oriented in the lateral direction, and a thickness that is oriented in the transverse direction; wherein the length of the handle is a maximum dimension of the handle to vertically orient the handle on the rear surface of the seat back. This exemplary embodiment or another exemplary embodiment may further include an imaginary vertical centerline of the seat back that is located centrally between the first side and the second side of the seat back; wherein the length of the handle extends along the vertical centerline. This exemplary embodiment or another exemplary embodiment may further include a first end of the handle; a second end of the handle; and a bar that extends from the first end to the second end, wherein the first end of the handle is vertically above the second end of the handle such that the bar is vertically oriented. This exemplary embodiment or another exemplary embodiment may further include a connection of the first end of the handle to the rear surface of the seat back; and a connection of the second end of the handle to the rear surface of the seat back; wherein a portion of the bar between the first end of the handle and the second end of the handle is spaced apart from the rear surface of the seat back to define an aperture between the bar and the rear surface of the seat back. This exemplary embodiment or another exemplary embodiment may further provide that the portion of the bar that is spaced apart from the rear surface of the seat back is curved.

In another aspect, this exemplary embodiment or another exemplary embodiment of the present disclosure may provide a handle for a chair, the handle comprising: an upper portion; a first portion and a second portion, wherein the first portion and the second portion are located vertically below the upper portion; and a lower portion, wherein the lower portion is located vertically below the first portion and the second portion; an aperture defined between the first portion and the second portion, wherein the aperture extends through the handle in a lateral direction; wherein the handle is configured to be installed vertically on a chair. This exemplary embodiment or another exemplary embodiment may further include a downwardly facing upper concave edge between the first portion and the second portion; and an upwardly facing lower concave edge between the first portion and the second portion, wherein the lower concave edge is below the upper concave edge. This exemplary embodiment or another exemplary embodiment may further include an aperture first edge on the first portion; an aperture second edge on the second portion; wherein the aperture is defined by the aperture first edge, the aperture second edge, the downwardly facing upper concave edge, and the upwardly facing lower concave edge. This exemplary embodiment or another exemplary embodiment may further include a radius of curvature of the downwardly facing upper concave edge that is greater than a radius of curvature of the upwardly facing lower concave edge. This exemplary embodiment or another exemplary embodiment may provide that the radius of curvature of the downwardly facing upper concave edge is approximately three times greater than the radius of curvature of the upwardly facing lower concave edge. This exemplary embodiment or another exemplary embodiment may further include an apex of the downwardly facing upper concave edge; a nadir of the upwardly facing lower concave edge; and a vertically oriented length of the aperture measured from the apex to the nadir, wherein the vertically oriented length of the aperture is in a range from about 5 inches to about 10 inches. This exemplary embodiment or another exemplary embodiment may further include a thickness dimension of the first portion that is measured in the transverse direction; and a thickness dimension of the second portion that is measured in the transverse direction; wherein the thickness dimension of first portion is greater than the thickness dimension of the second portion. This exemplary embodiment or another exemplary embodiment may provide that the length dimension of the handle is in a range from about 15 inches to about 30 inches, wherein the width dimension of the handle is in a range from about 0.5 inch to about 3 inches, and wherein the thickness dimension of the handle is in a range from about 1 inch to about 4 inches.

BRIEF DESCRIPTION OF THE DRAWINGS

Sample embodiments of the present disclosure are set forth in the following description, are shown in the drawings and are particularly and distinctly pointed out and set forth in the appended claims.

FIG. 1 (FIG. 1) is a top rear perspective view of a chair having a vertically oriented handle on the rear surface of a seat back according to one aspect of the present disclosure.

FIG. 7 (FIG. 7) is an elevation view of the handle.

FIG. 8 (FIG. 8) is a side elevation view of the handle.

Similar numbers refer to similar parts throughout the drawings.

DETAILED DESCRIPTION

Figure 1:
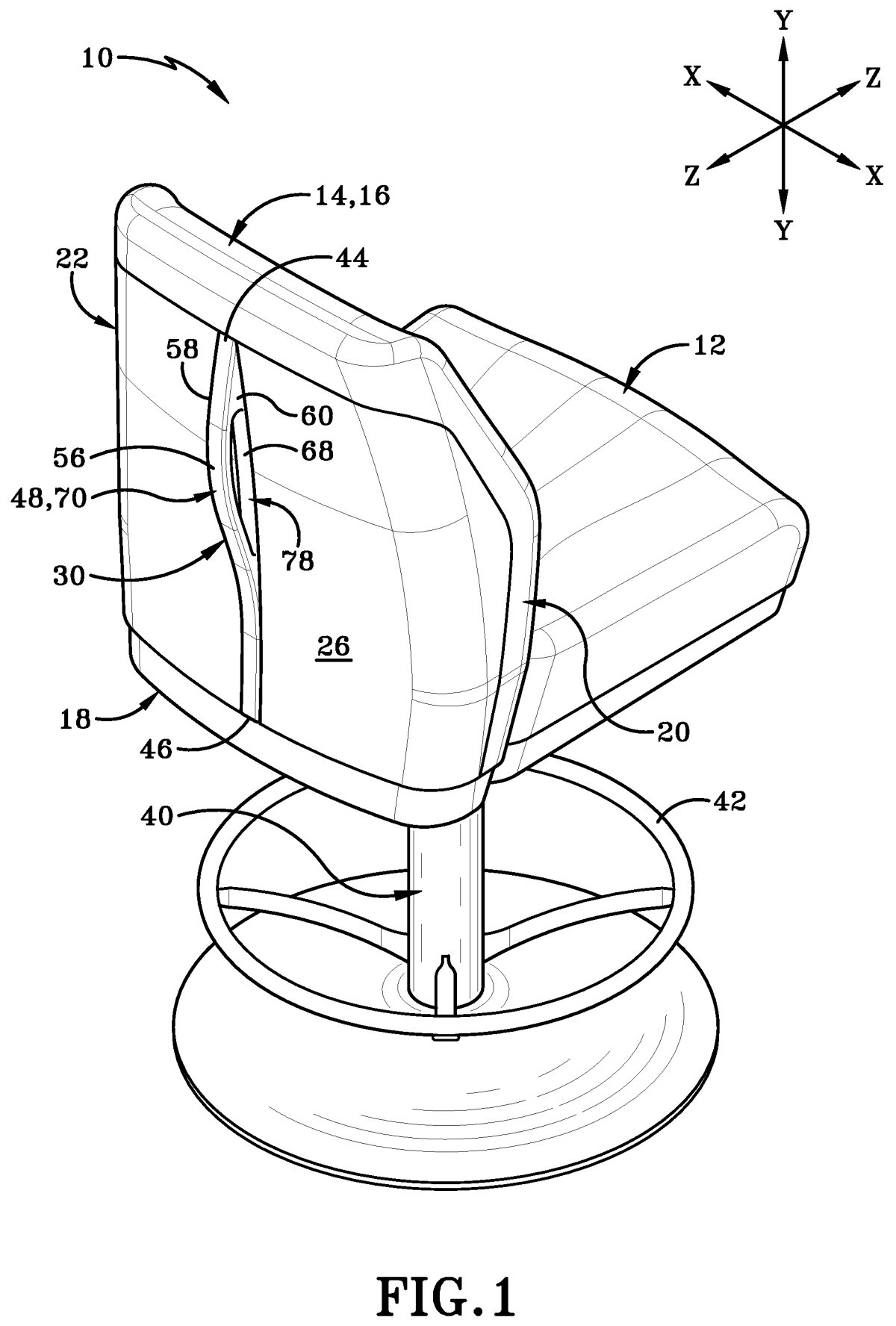
Figure 2:
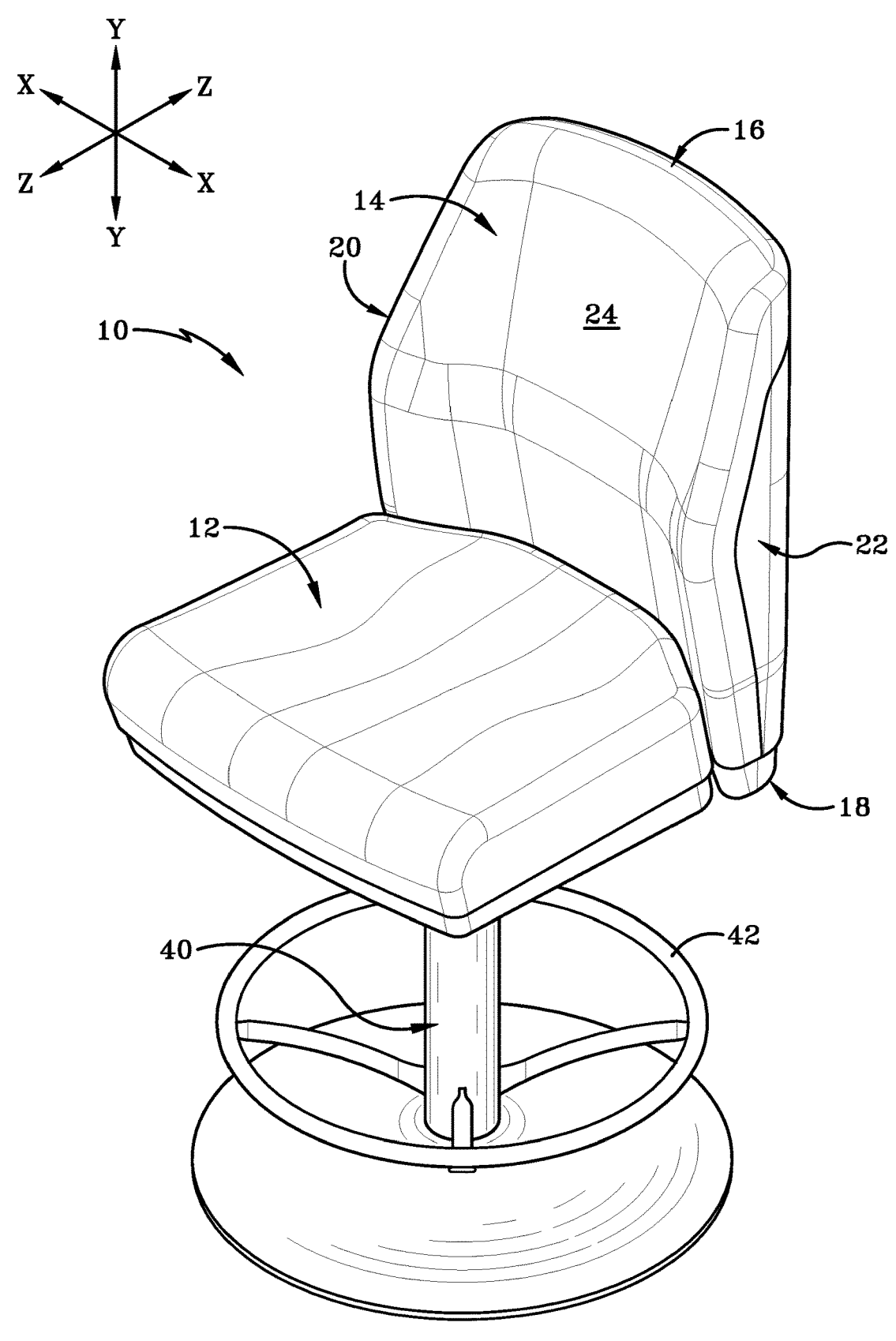
FIG. 2 (FIG. 2) is a top front perspective view of the chair.
Figure 3:
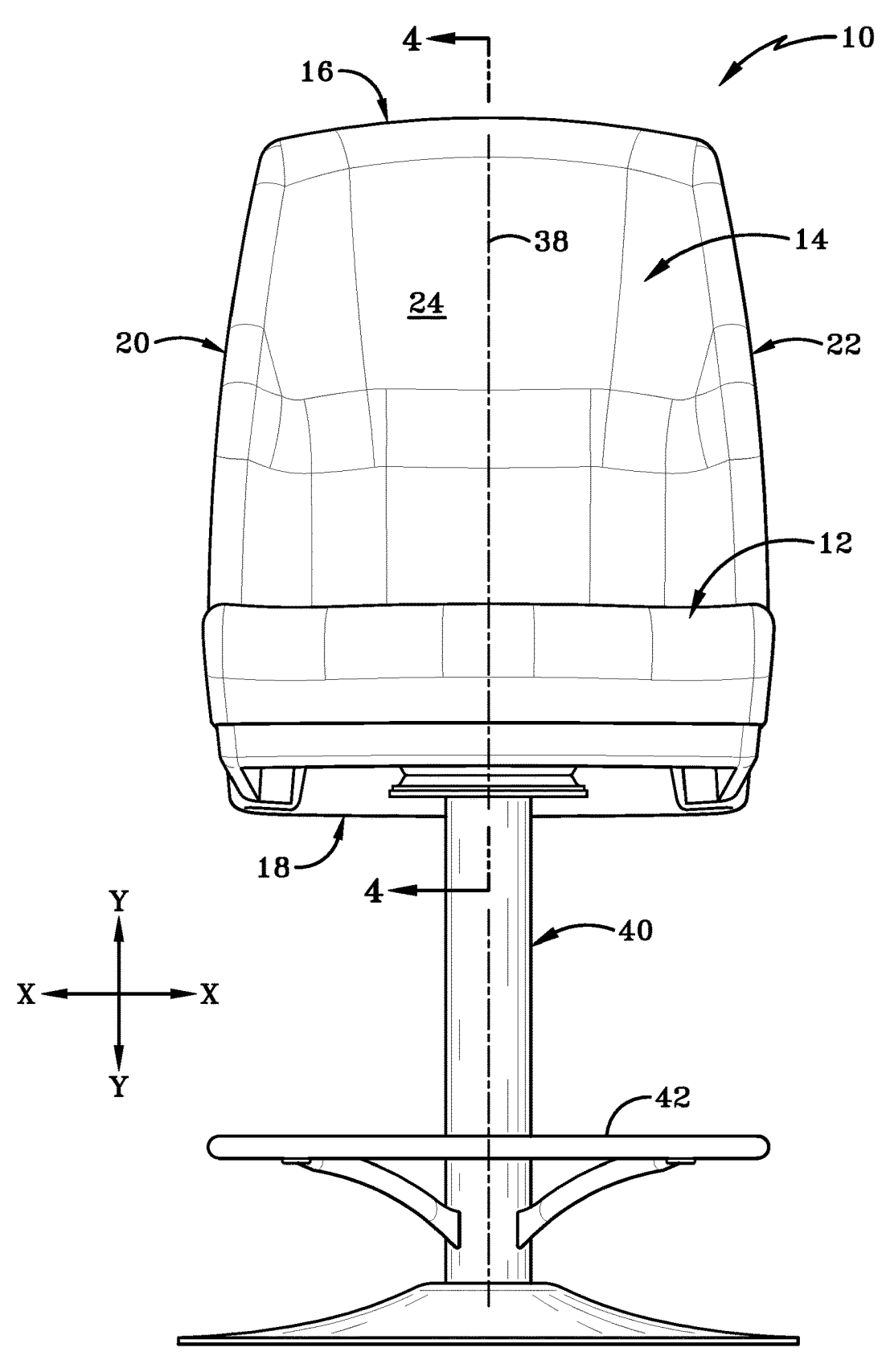
FIG. 3 (FIG. 3) is a front elevation view of the chair.
Figure 4:
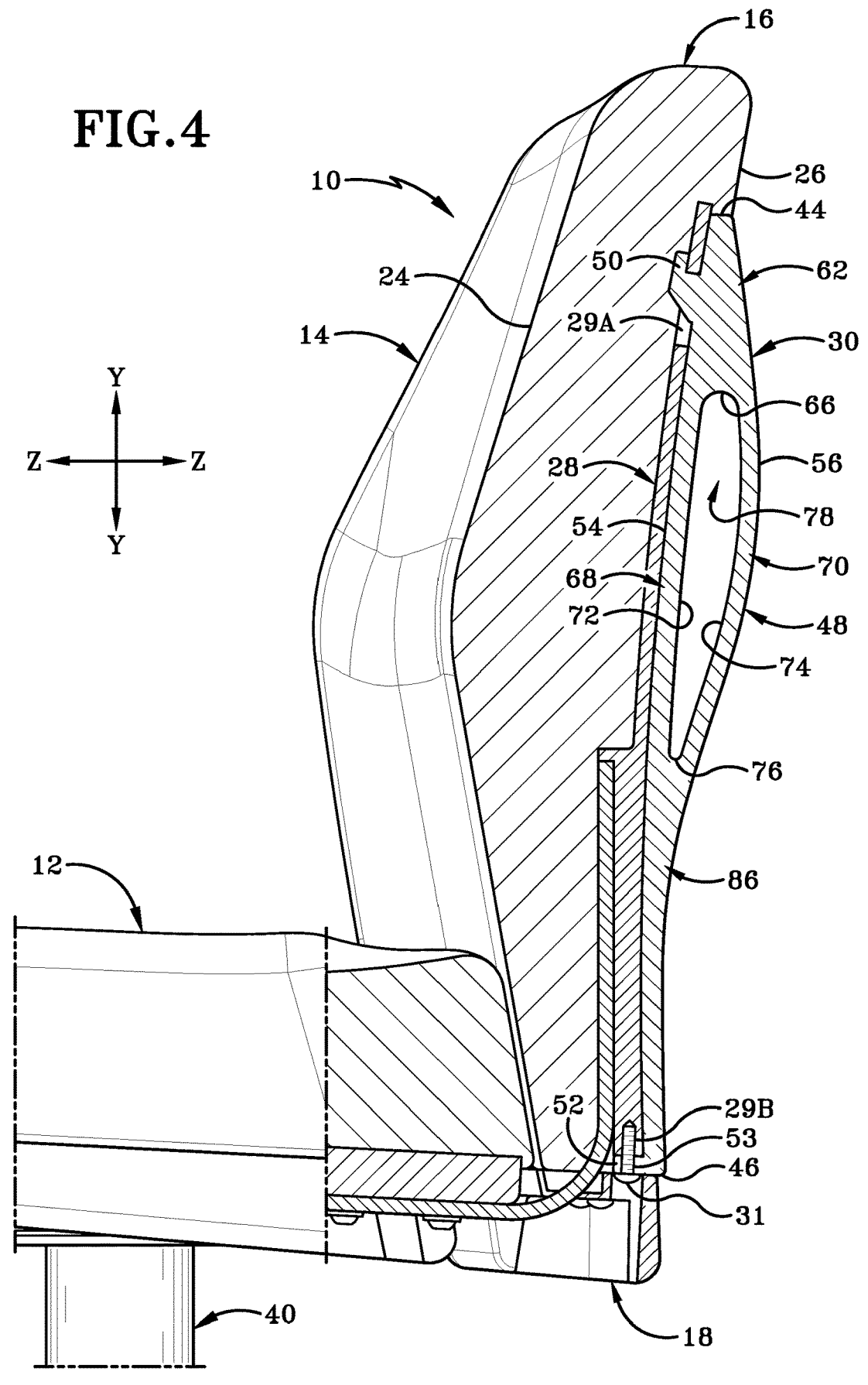
FIG. 4 (FIG. 4) is a vertical cross section view of the chair taken along line 4-4 in FIG. 3.
Figure 5:
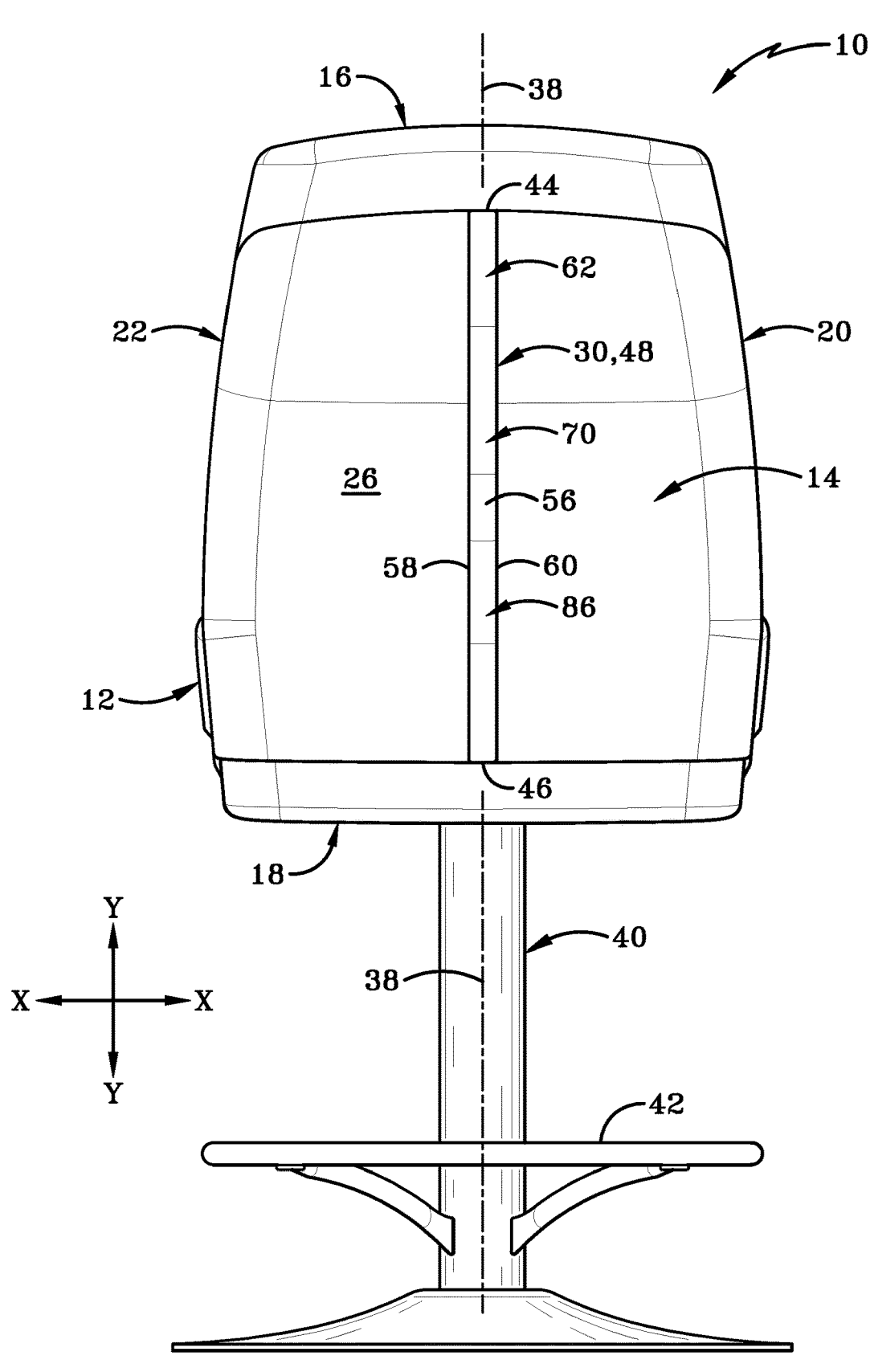
FIG. 5 (FIG. 5) is a rear elevation view of the chair.
Figure 6:
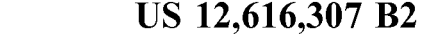
FIG. 6 (FIG. 6) is a top perspective view of the handle.
Figures 9, 10:
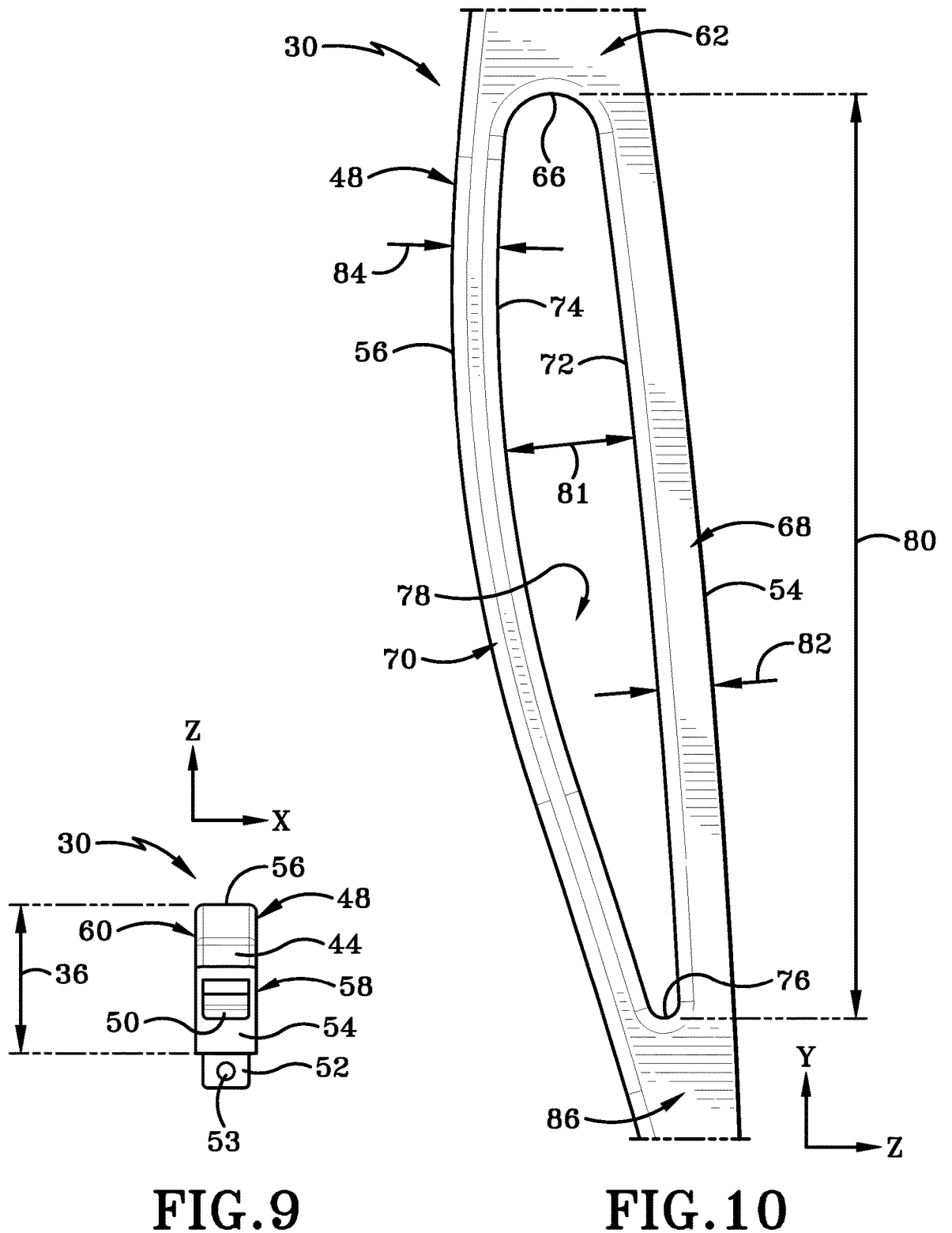
FIG. 9 (FIG. 9) is a top plan view of the handle.
FIG. 10 (FIG. 10) is an enlarged side elevation view of the handle portion of the region labeled "See FIG. 10" in FIG. 8.

FIG. 1 through FIG. 5 depict an exemplary chair 10. Chair 10 may include a seat 12 adapted to be sit upon by a sitter or a user. Chair 10 may include a seat back 14 having an upper end 16 and a lower end 18 defining a vertical direction Y therebetween, and the seat back 14 having a first side 20 and a second side 22 defining a lateral direction X therebetween, and the seat back having a front surface 24 and a rear surface 26 defining a transverse direction Z therebetween. Chair 10 has a handle 30 on the rear surface 26 of the seat back 14. The rear surface 26 may be defined by a rigid plate 28 of the seat back 14. The handle has or includes a length dimension 32 (see FIG. 7) that is oriented in the vertical direction Y, a width dimension 34 (see FIG. 7) that is oriented in the lateral direction X, and a thickness dimension 36 (see FIG. 9) that is oriented in the transverse direction Z. The length 32 of the handle 30 is a maximum dimension of the handle 30 to vertically orient the handle 30 on the rear surface 26 of the seat back 14. The term maximum dimension refers to the length 32 of the handle 30 being greater than the width 34 of the handle 30 and greater than the thickness 36 of the handle 30. In one exemplary embodiment, the thickness 36 is less than the length 32 and less than the width 34. There may be an imaginary vertical centerline 38 of the seat back 14 that is located centrally between the first side 20 and the second side 22 of the seat back 14. In one embodiment, the length 32 of the handle 30 extends along or is coaxial with the vertical centerline 38.

Chair 10 may also include a base 40 having a foot rest 42 or foot ring. The base 40 is depicts as a pedestal-style base. Although the base 40 described herein is shown as a pedestal-style base for the chair 10, other configurations are entirely possible without departing from the scope of the present disclosure. For example, the base 40 of the chair may be four-legged with four legs extending downward from the seat at each corner. Four-legged chairs provide stable support and are typically stationary, meaning they do not have any mechanisms for movement or adjustment. Alternatively, the chair 10 may have a sled base. Chairs with a sled base have a single tubular frame that curves into a continuous loop, resembling a sled. The curved base allows for smooth movement across floors and offers stability. Sled base chairs are generally stationary but can be moved easily when not in use. Or, the chair may have a swivel base. Swivel chairs have a central pedestal-style base that allows the seat to rotate 360 degrees horizontally. The pedestal is usually fixed to the floor and incorporates a swivel mechanism that enables the chair to turn smoothly. Swivel chairs provide mobility and are commonly found in office environments. Or, the chair 10 may include caster wheels. Some chairs feature a set of wheels or casters attached to the legs or base. Caster wheels allow for easy movement and can be found on office chairs, task chairs, and some dining chairs. These wheels are typically designed to roll smoothly on various floor surfaces. Or the base 40 may include a pneumatic or gas lift. Pneumatic or gas lift mechanisms are often used in office chairs and some task chairs to provide height adjustability. These chairs have a central pedestal base with a gas cylinder inside. By pressing a lever or a button, the user can adjust the chair's height, raising or lowering the seat to their preferred position. Or the base 40 of the chair may be a rocking or glider base. Rocking chairs and gliders have curved bases that enable the chair to rock back and forth in a smooth motion. These chairs are often used for relaxation and can have either wooden or metal glider bases. Or, the base 40 of the chair 10 may be a cantilever base. Cantilever chairs have a unique leg design where the seat is supported by a single tubular frame or a series of curved or angled supports. This design provides a slight bounce or flexibility, giving a comfortable seating experience. Cantilever chairs do not have back legs and are often seen in modern or minimalist designs. This list of base-types is meant to be exemplary and not exhaustive. Other types of base configurations for chair 10 are entirely possible without departing from the teachings herein.

The base 40 shown herein is detailed with a footrest 42 or foot ring. A foot ring is a circular or oval-shaped metal or plastic ring attached to the base or pedestal of a chair. It extends outward and provides a comfortable place for resting the feet. Foot rings are commonly found in drafting chairs, bar stools, and high chairs, where users sit at elevated heights. However, other footrests are entirely possible without departing from the scope of the present disclosure. For example, instead of a foot ring, there may be an adjustable footrest that is a separate accessory that can be placed under a desk or used with a chair. It allows users to customize the height and angle of the footrest to their preference, promoting proper ergonomics and reducing strain on the legs and lower back. Or, there may be a footstools or ottoman, which are standalone pieces of furniture specifically designed for resting the feet. They come in various shapes, including square, rectangular, or round, and can be upholstered or cushioned for added comfort. Footstools are often used in living rooms or lounges. Or, there may be a built-in footrest or a flip-up footrest. Or, swinging footrests are commonly found in rocking chairs or glider chairs. These footrests are attached to the chair's frame and can be swung back and forth in coordination with the chair's motion, providing a relaxing and comfortable experience. Or, there may be an extended leg rest. These leg rests can be elevated or lowered to provide support and elevation for the legs and feet, often used for medical treatments or recovery purposes.

Although the seat back 14 described herein is shown as a solid back, other configurations are entirely possible without departing from the scope of the present disclosure. For example, the seat back 14 may take on any configuration that may or may not include a splat, an ear(s), finials, slats, spindles or a lattice. A splat refers to a decorative, often vertical central panel that extends upward from the seat and serves as the primary back support. It can be flat or curved and may feature intricate carvings or patterns. An ear, also known as "wings" or "lugs," ears are protruding elements located on the sides of a chair back, resembling ears in shape. They can be purely decorative or provide additional support and comfort for the sitter's head. Finials are ornamental details that cap or top off the vertical posts of the chair back. These decorative elements can take various shapes, such as acorn-like or turned shapes, and add a finishing touch to the chair's design. Slats are horizontal or slightly angled bars that run across the seat back, providing support while creating an open and visually interesting pattern. They can be thin or wide, spaced closely or with gaps between them, depending on the desired aesthetic. Spindles are vertical rods or turned supports that form the back of a chair. They are typically evenly spaced and can vary in number, creating a classic, visually appealing design. Spindle backs can be simple or feature decorative patterns. A lattice-style seat back incorporates a network of intersecting slats or spindles, forming a grid-like pattern. This design provides both support and an airy, open feel, often found in traditional or rustic chair styles. As shown herein, the solid back features a solid, continuous back panel without any decorative elements or openings. This configuration offers a clean, minimalist look and provides ample support for the sitter.

The chair 10 of the present disclosure can be provided without armrests as well. For example, there are many types of chairs that do not have armrests. Such as some dining chairs to allow for easy movement and flexibility around the dining table. These chairs are typically designed to maximize space and accommodate multiple guests. Or, side chairs that are versatile seating options used in various settings, including dining rooms, offices, and living areas. They are typically armless and can be easily moved and arranged as needed. Or, folding chairs that are portable and collapsible, often used for temporary seating in events, gatherings, or outdoor activities. To ensure ease of storage and transportation, they are usually armless. Or, stacking chairs that are designed to be stacked on top of one another when not in use, optimizing storage space. Armless designs allow for efficient stacking and save space. Or, a bench that has a long seat that can accommodate multiple people. They typically do not have armrests, providing more flexibility in terms of seating arrangements and accommodating a larger number of individuals (however some benches, such as a park bench may include an armrest at each end).

Further, while the chair detailed herein is shown without armrests, it is entirely possible for the chair to have armrests without departing from the scope of the present disclosure. For example, the chair of the present disclosure could be one of the following types of chairs that typically have armrests. The chair of the present disclosure could have armrests if it is a lounge chairs inasmuch as lounge chairs are designed for relaxation and comfort, often featuring wide and plush seating areas. They typically have armrests on both sides, allowing users to rest their arms while lounging or reading. Or, if the chair is an office chair with armrests to provide support and reduce strain on the arms and shoulders during long periods of sitting. Adjustable armrests are common in ergonomic office chairs, allowing users to customize the height, width, and angle for optimal comfort. Or a dining chair with armrests at the ends of the table, known as "captain's chairs" or "host chairs." These chairs are usually larger and more elaborately designed, serving as the head or anchor chairs at a dining table. Or, accent chairs often have armrests as they are intended to provide both comfort and style. They can be used in living rooms, bedrooms, or other spaces where additional seating is desired.

FIG. 6 through FIG. 9 depict the handle 30 in greater detail. Handle 30 includes a first end 44 and a second end 46. A bar 48 that extends from the first end 44 to the second end 46, wherein the first end 44 of the handle 30 is vertically above the second end 46 of the handle 30 such that the bar is vertically oriented when attached to the rear surface 26 of the seat back 14 of chair 10. The bar 48 of handle 30 may also be considered to be a handle body. The bar 48 or handle body may be a unibody that is integrally extruded, molded, printed, or additively manufactured, removably machined, or formed as a unitary, monolithic member substantially fabricated from a rigid, manmade, material. In one example, metal or metal alloys, such as stainless steel or aluminum alloy or brass/bronze, may form a substantial majority of the components or elements used to fabricate the bar 48 or handle body and the various components integrally formed, molded, or extruded therewith. The rigid bar 48 or handle body should withstand typical chair maneuvering or handling from a user grasping the handle 30 and moving the chair 10 without damaging the bar 48 or handle body. While it is contemplated that the bar 48 or handle body and its additional components described herein are uniformly and integrally extruded, molded, or formed, it is entirely possible that the components of the bar 48 or handle body be formed separately from alternative materials as one having routine skill in the art would understand. In another example, the bar 48 or handle body may be formed from a rigid or semi-rigid elastomeric material or rubber material configured to withstand deformation upon impact during operation by the user (i.e., if the chair inadvertently tips over and falls on the handle 30 during movement). Furthermore, while the components of the bar 48 or handle body are discussed below individually, it is to be clearly understood that the components and their corresponding reference elements of the bar 48 or handle body are portions, regions, or surfaces of the body and all form a respective element or component of the unitary the bar 48 or handle body. Thus, while the components may be discussed individually and identified relative to other elements or components of the bar 48 or handle body, in this exemplary embodiment, there is a single bar 48 or handle body having the below described portions, regions, or surfaces.

A first connector 50 may be located at or near the first end 44 of the handle 30 to couple or effectuate a connection of the handle 30 to the rear surface 26 of the seat back 14. In one particular embodiment the first connector 50 fits within a first receiver 29A formed in or defined by the rigid plate 28 of seat back 14. The first receiver 29A may be in the form of an aperture that extends at least partially or fully through the rigid plate 28 of the seat back 14 in the transverse direction. In one embodiment, the first connector 50 is a hook-shaped or L-shaped connector that extends in the transverse direction Z from a first vertical surface 54 of bar 48 near or at the upper or first end 44 of handle 30. The hook shaped or L-shaped connector is configured to attached with a complementary receptacle in the rear surface 26 of seat back 14. Given the first connector 50 is hook shaped or L-shaped, there may be a first leg that extends in the transverse direction Z from surface 54 and a second leg that extends upward in the vertical direction Y from the end of the first leg. The terminal end of the first leg may terminate vertically below, above, or equal with the upper or first end 44 of the bar 48 or handle body of handle 30. Although the first connector is detailed as being hook-shaped or L-shaped, other shapes or configurations of first connector 50 are entirely possible. For example, first connector 50 may be a bracket-shaped connector to attach the upper end of the handle 30 to the seat back. The bracket may have screw holes or other attachment mechanisms to ensure a sturdy connection. A T-shaped connector is another option for attaching the upper end of the handle 30 to the seat back. This connector features a vertical stem that connects to the handle and a horizontal crossbar that spans across the rear surface of the seat back. The crossbar can be secured to the seat back using screws or other fasteners, providing a stable connection for the handle. A plate connector is another option for first connector 50 and involves using a flat plate or mounting bracket to connect the upper end of the handle to the rear surface of the seat back. The plate is typically attached to the handle and then fastened securely to the seat back using screws or other appropriate hardware. This type of connector offers a simple and effective way to join the handle and seat back. A clamping connector is another type of connector that utilizes a clamping mechanism to secure the upper end of the handle to the rear surface of the seat back. This connector may feature a clamp that can be tightened or released to grip the seat back tightly. It provides a flexible and adjustable connection, allowing the handle to be easily attached or detached as needed. Further alternatively, adhesive connectors can be used to attach the upper end of the handle to the rear surface of the seat back. This involves using strong adhesive materials or tapes specifically designed for secure attachment. The adhesive connector provides a clean and seamless appearance without the need for visible screws or hardware.

A second connector 52 may be located at or near the second end 46 of the handle 30 to couple or effectuate a connection of the handle 30 to the rear surface 26 of the seat back 14. In one particular embodiment the second connector 52 fits within a second receiver 29B formed in or defined by the rigid plate 28 of seat back 14. The second receiver 29B may be in the form of an aperture or slot that extends at least partially or fully through the rigid plate 28 of the seat back 14 in the transverse direction. In one embodiment, the second connector 52 is a tab-shaped connector that extends in the transverse direction Z from the first vertical surface 54 of bar 48 near or at the lower or second end 46 of handle 30. There may be an aperture 53 that extends in the vertical direction Y formed in the second connector 52 that is configured to receive a screw 31 therethrough. The tab-shaped connector is configured to attached with a complementary receptacle (i.e., second receiver 29B) in the rear surface 26 of seat back 14. The second receiver 29B may define a threaded bore in the rigid plate 28 to receive screw 31 to attach the handle 30 to chair 10. As previously detailed, any other type of connector may be utilized to attach the lower or second end 46 of the bar 48 or handle body of handle 30 to the rear surface 26 of the seat back 14.

The length 32 of handle 30 can be selected by the manufacturer depending on the application specific needs of the handle 30 and chair 10. In one particular embodiment, the length 32 of handle is selected to have a dimension that is in a range from about 15 inches to about 30 inches. In another particular embodiment, the length 32 of handle is selected to have a dimension that is in a range from about 18 inches to about 22 inches. In another specific embodiment, the length 32 of handle is selected to have a dimension of about 20 inches.

The width 34 of handle 30 can be selected by the manufacturer depending on the application specific needs of the handle 30 and chair 10. In one particular embodiment, the width 34 of handle 30 is selected to have a dimension that is in a range from about 0.5 inch to about 3 inches. In another particular embodiment, the width 34 of handle 30 is selected to have a dimension that is in a range from about 0.75 inch to about 2 inches. In another specific embodiment, the width 34 of handle 30 is selected to have a dimension of about 1 inch.

The thickness 36 of handle 30 can be selected by the manufacturer depending on the application specific needs of the handle 30 and chair 10. In one particular embodiment, the thickness 36 of handle 30 is selected to have a dimension that is in a range from about 1 inch to about 4 inches. In another particular embodiment, the thickness 36 of handle 30 is selected to have a dimension that is in a range from about 1.5 inches to about 3 inches. In another specific embodiment, the thickness 36 of handle 30 is selected to have a dimension of about 2.18 inches.

A second vertical surface 56 is opposite the first vertical surface 54. In one particular embodiment, the first vertical surface 54 of bar 48 is configured to contact the rear surface 26 of the seat back 14 of chair 10. Thus, the first vertical surface 54 may be considered to be the "forward" surface of the bar 48 of handle 30 and the second vertical surface 56 may be considered as the "rear" surface of bar 48 of handle 30 relative to the transverse direction Z.

Handle 30 includes a first side 58 and an opposite second side 60 that face opposing directions relative to the lateral direction X. The bar 48 of handle 30 extends vertically in the vertical direction Y from the first end 44 of handle 30 to the second end 46. The first end 44 may be associated with the top of handle 30 and the second end 46 may be associated with the bottom of handle 30. The bar 48 includes an upper portion 62. The upper portion 62 may either be solid or hollow. The second surface 56 is convexly curved at the upper portion 62. The upper portion 62 has a vertically oriented length 64 that extends from the first end 44 and terminates at a downwardly concave edge 66. In one particular embodiment, the length 64 of the upper portion 62 extending between first end 44 and the apex of concave edge 66 is in a range from about 2 inches to about 4 inches. In one particular embodiment, the length 64 off the upper portion 62 is about 3.5 inches.

Below the upper portion 62, the bar 48 splits or bifurcates into a forward or first portion 68 and a rear or second portion 70. The first portion 68 is defined by the first surface 54 and an aperture first edge 72. The second portion 70 is defined by the second vertical surface 56 and an aperture second edge 74. The aperture first edge 72 and the aperture second edge 74 extend vertically downward in the vertical direction Y from the concave edge 66 to an upwardly facing lower concave edge 76. Collectively, concave edge 66, aperture first edge 72, aperture second edge 74, and lower concave edge 76 define an aperture 78 that extends laterally through the bar 48 of handle 30 in the lateral direction X. The aperture 78 allows a user to insert their hand through the aperture 78 in the lateral direction X in order to grasp the second portion 70 of the bar 48 of handle 30 in order to pull or otherwise maneuver the chair 10. The vertical length of the aperture 78 is measured from the apex of the downwardly facing concave edge 66 to the nadir of the upwardly facing concave edge 76. The length 80 of aperture 78 may be in a range from about 5 inches to about 10 inches. In one particular embodiment, the length 80 of the aperture 78 is about 7.5 inches.

The first portion 68 of bar 48 of handle 30 may have a thickness measured in the transverse direction Z. The thickness dimension 82 of the first portion 68 is measured between the first vertical surface 54 and the aperture first edge 72. The thickness dimension 82 of the first portion 68 may be in a range from about 0.25 inch to about 1 inch. In one particular embodiment, the thickness 82 of the first portion 68 is about 0.4 inch. The second portion 70 may have a thickness dimension 84 that is measured in the transverse direction Z from the second vertical surface 56 to the aperture second edge 74. The thickness dimension 84 of the second portion 70 may be in a range from about 0.25 inch to about 1 inch. In one particular embodiment, the thickness dimension 84 of the second portion 70 is about 0.4 inch. The thickness dimension 82 and the thickness dimension 84 may be the same. In another embodiment, the thickness dimension 82 and the thickness dimension 84 may differ. For example, it is possible for the thickness dimension 82 to be about 0.39 inch and the thickness dimension 84 to be about 0.37 inch.

Aperture 78 may have a maximum space dimension 81 or "thickness" measured in the transverse direction Z. The maximum space dimension 81 is the greatest or maximum dimension of the aperture between the aperture first edge 72 on the first portion 68 and the aperture second edge 74 on the second portion 70. Given the curvature of first portion 68 and the second portion 70, it is to be understood that other space dimension of the aperture 78 will be smaller than the maximum space dimension 81. In one embodiment, the maximum space dimension 81 of the aperture 78 may be in a range from about 0.5 inch to about 3 inch. In another embodiment, the maximum space dimension 81 of the aperture 78 may be in a range from about 0.75 inch to about 2 inches. In one particular embodiment, the maximum space dimension 81 of the aperture 78 is about 1.12 inches.

The curvature of each concave edge 66 and 76 will have a radius of curvature. In one particular embodiment, the radius of curvature of the downwardly facing concave edge 66 is greater than the radius of curvature of the upwardly facing lower concave edge 76. More particularly, the radius of curvature of concave edge 66 is about three times greater than the radius of curvature of concave edge 76. For example, if the radius of curvature of the lower concave edge 76 is about 0.3 inch, then the radius of curvature of the upper downwardly facing concave edge 66 is about 0.39 inch.

Each of the edges that define the aperture 78 may be filleted to provide a smooth and ergonomic opening for the aperture 78. The fillet of each edge defining the aperture 78 may be a 0.13 inch fillet along the entire perimeter of each side of the opening or aperture 78.

At the lower end of each of the first portion 68 and the second portion 70, the portions join or union below the lower concave edge 76 to define a lower portion 86 of the bar 48 on handle 30. The lower portion 86 extends downwardly in the vertical direction from the nadir of the lower concave edge 76 to the lower or second end 46 of bar 48 of handle 30. The second surface 56 is curved on the lower portion 86 of the bar 48 of handle 30. A portion of the second surface 56 may be concavely curved at the lower portion 86.

In one exemplary embodiment, aperture 78 is slightly vertically offset closer to the upper or first end 44 of the handle 30, as shown throughout the Figures. However, it is possible to bias or offset or otherwise dispose of the aperture 78 vertically center relative to the handle.

One exemplary advantage of handle 30 on chair 10 is that the vertically oriented handle 30 on the rear surface 26 of a chair 10 may offer ergonomic benefits based on the natural positioning of a user's wrist when pulling the handle 30 to move or drag the chair 10. The configuration of handle 30 takes advantage of the biometric alignment of the wrist, resulting in improved comfort and reduced strain. For example, when pulling an object towards oneself, the human wrist naturally adopts a slightly flexed position. This position, known as wrist extension, is biomechanically advantageous as it aligns the bones and reduces stress on the wrist joint. The vertically oriented handle 30 allows users to maintain this natural alignment while pulling the chair 10, which may help minimize the risk of discomfort or injury. Additionally, the wrist is at its biomechanical peak when it is in a neutral or slightly extended position. By positioning the handle 30 vertically on the rear surface 26 of the chair 10, users can utilize the muscles and tendons in their forearm more effectively, thereby maximizing grip strength. This results in a more secure and controlled hold on the chair during movement. This is because when the wrist is properly aligned, the muscles responsible for wrist extension, such as the extensor carpi radialis longus and brevis, can function optimally. By utilizing these muscles, users can distribute the load evenly across their forearm and upper body, reducing localized muscle fatigue and strain. This allows for more efficient and sustainable movement of the chair. Further, the handle 30 may also reduce the risk of wrist overextension. Overextension of the wrist can occur when pulling an object with a handle that is not aligned with the wrist's natural position. This can lead to discomfort, strain, or even injuries such as tendonitis or carpal tunnel syndrome. The vertically oriented handle 30 on the rear surface 26 of the chair 10 may reduce the risk of overextension, promoting a healthier wrist posture during the pulling motion. The vertically oriented handle 30 may also allow for easier adaptation to users of various heights. Unlike handles placed at specific heights, which may cause discomfort or strain for taller or shorter individuals, a handle on the rear surface enables users to adjust their grip position based on their height, maintaining optimal biomechanics during chair movement. Additionally, the vertical handle 30 position creates a more direct line of force transmission from the user's arm to the chair, enhancing overall biomechanical efficiency. This means that less energy is wasted and more force is directed toward moving the chair, resulting in smoother and easier chair transport. Thus, by considering the natural alignment of the wrist and leveraging the biometric positioning of users' bodies, the vertically oriented handle 30 on the rear surface 26 of the chair 10 can provide ergonomic benefits.

Another exemplary advantage of handle 30 on chair 10 is that the vertically oriented handle 30 on the rear surface 26 of a chair 10 may contribute, specifically when positioned centrally along centerline 38, to centralizing the chair's center of gravity. This has implications for stability and ease of maneuverability. For example, the handle 30 may assist with centralized weight distribution. The center of gravity of an object refers to the point where its weight is evenly balanced in all directions. In the chair 10, the center of gravity typically lies in the middle of the seat area, where most of the weight is concentrated. When the handle 30 is positioned centrally on the rear surface 26, it aligns with the chair's center of gravity, helping to distribute the weight more evenly. Placing the handle 30 in the center along centerline 38 of the rear surface 26 ensures that the force exerted while moving the chair is applied closer to the chair's center of gravity. This creates a more stable configuration, as the applied force is less likely to cause the chair to tip over or become unbalanced during transportation. The centralized handle 30 minimizes the chances of the chair toppling forward or backward, providing greater stability and reducing the risk of accidents. Further, when lifting or dragging the chair 10 using the handle 30 positioned centrally on the rear surface 26, the applied force aligns with the chair's center of gravity. This balanced distribution of force allows for smoother movement and easier control. Users can maintain better stability and exert force in a more controlled manner, resulting in reduced strain on the body and more efficient chair transport. Still further, the vertically oriented handle 30 positioned centrally on the rear surface 26 can provide an advantage in navigating through narrow or crowded spaces. By aligning the handle 30 with the chair's center of gravity, users can exert force more precisely and maneuver the chair with greater ease. This is particularly beneficial when there is limited clearance or obstacles that require precise control over the chair's movement, such as when the chair 10 is utilized in a casino where there are many gaming machines and narrow aisles. Further, the length of the lower portion 86 being longer than the upper portion 62 may assist to lower the center of gravity relative to the vertical direction Y. Given these exemplary advantages relating to the increased stability, the dimensions of the handle 30 or portions of the handle 30 there may be some criticality to the claimed dimensional ranges. In one particular embodiment, handle 30 is the only handle on chair 10. In one particular embodiment, handle 30 is the only handle on the seat back 14 of the chair 10, but there may be other handles at other locations of chair 10.

In contrast to the chair 10 of the present disclosure having the vertically oriented handle 30, a horizontally aligned handle may not offer the same advantages in terms of centralizing the center of gravity. With a horizontal handle, the force applied during movement would be distributed differently, potentially causing an imbalance or making it more challenging to control the chair's motion. This could result in reduced stability, increased strain, and difficulties in maneuvering, especially in confined spaces. Thus, the vertically oriented handle 30 positioned centrally on the rear surface of the chair 10 not only provides ergonomic benefits but also helps to centralize the chair's center of gravity. This improves stability, enhances maneuverability, and ensures a more balanced distribution of weight and force during chair transportation.

There may be some other benefits of the vertically oriented handle 30 on chair 10. For example, the vertically oriented handle 30 on the rear surface of a seat back 14 offers a distinct advantage by improving visibility for users.

Handles that extend horizontally from the sides or back of a chair can obstruct the line of sight, particularly when navigating through crowded areas or tight spaces. In contrast, a vertically oriented handle 30 minimizes obstructions, providing users with a clearer view of their surroundings. This enhanced visibility promotes better situational awareness, allowing users to anticipate potential obstacles, navigate more safely, and reduce the risk of accidents or collisions.

The positioning of the vertically oriented handle 30 on the rear surface 26 of the seat back 14 can greatly facilitate cleaning and maintenance efforts. Handles that extend horizontally can be challenging to clean around or behind, as they create crevices or obstacles that impede the cleaning process. With the vertically oriented handle 30, cleaning becomes more accessible and efficient. Janitorial staff or individuals responsible for chair maintenance can easily reach the area around and behind the chair without hindrance, ensuring thorough cleaning and maintenance practices are upheld. The smooth and rounded surface of the curved portions of handle 30 allows for easy wipe-down during cleaning. Unlike handles with sharp corners or crevices that can trap dirt and grime, the curvature of the handle 30 eliminates such potential trouble spots. Cleaning staff or individuals responsible for maintenance can quickly and effectively clean the handle by simply wiping it down with a damp cloth or disinfectant. The absence of sharp corners minimizes the effort required to remove dirt, making the cleaning process more efficient. The curved shape of the second portion 70 of the handle 30 ensures seamless access during cleaning routines. It enables cleaning tools, such as brushes or cloths, to glide smoothly along the handle without encountering any sharp corners or hard-to-reach areas. This allows for thorough cleaning, even in the crevices between the handle and the seat back. The lack of corners or edges that accumulate dirt makes it easier to maintain hygiene standards and keep the chair clean and presentable. The absence of sharp corners and crevices on the curved handle reduces the likelihood of dirt and debris buildup over time. Dust, crumbs, or other particles are less likely to collect in hard-to-reach areas, ensuring that the handle remains clean and free of residue. This not only simplifies regular cleaning but also minimizes the need for deep cleaning or intensive maintenance. The smooth surface of the curved handle discourages the accumulation of dirt, promoting cleanliness and reducing the risk of bacterial growth or unpleasant odors. The handle's smooth and continuous shape aligns with hygienic considerations. It eliminates potential areas where bacteria or germs can harbor, making the handle easier to clean and sanitize effectively. This is particularly important in environments where cleanliness is paramount, such as healthcare facilities, food service establishments, or public spaces. The curvature of the handle ensures that it can be thoroughly disinfected, reducing the risk of cross-contamination and maintaining a hygienic environment.

The inclusion of the vertically oriented handle 30 at the center of the rear surface 26 creates a symmetrical design aesthetic for the chair 10. Symmetry is often visually appealing, as it provides a sense of balance and harmony. Chair 10 with the centrally positioned vertical handle 30 exhibits a pleasing and uniform appearance, especially when chairs are arranged in rows or groups. This symmetrical design can contribute to an organized and cohesive visual layout, whether in formal settings such as conference rooms or in more casual environments like dining areas or casinos. The balanced design of chair 10 can also make it versatile and suitable for various room layouts or seating arrangements, adapting well to different spatial configurations.

In environments where chairs need to be arranged uniformly or in a specific configuration, the vertically oriented handle 30 on the rear surface can play a crucial role in maintaining consistency. The handle's central position serves as a reference point, allowing for easy identification and alignment of chairs. This consistency in chair arrangement not only creates a visually appealing and organized aesthetic but also promotes efficient space utilization. Whether in classrooms, theaters, casinos, or event venues, the presence of centrally positioned handles helps ensure that chairs are properly arranged, contributing to an orderly and professional atmosphere.

Multiple chairs 10 with vertically oriented handles 30 on the rear surface may offer increased compatibility with storage systems designed specifically for such handles. These storage systems, such as chair racks or hangers, can be customized to accommodate the shape and position of the handles. This compatibility simplifies the storage process and ensures that chairs can be safely and securely stored when not in use. The ability to neatly and efficiently store chairs reduces clutter and optimizes space utilization, whether in storage rooms, warehouses, or event venues, improving overall organization and convenience.

The rear surface 26 of the seat back 14, where the vertically oriented handle 30 is located, presents an excellent space for customization and branding. This area offers high visibility, making it an ideal spot to display logos, company names, or decorative patterns. Chairs with branded handles can serve as effective marketing tools, promoting brand recognition and creating a professional and cohesive atmosphere. Customization options can extend to various industries and settings, including corporate offices, casinos, hospitality venues, educational institutions, and public spaces, allowing organizations to leave a lasting impression on users and visitors. The curvature of the handle 30 can serve as a natural contour for incorporating logos or brand symbols. By aligning the logo with the curve of the handle 30, it can seamlessly follow the shape, creating a visually appealing and cohesive design. This not only reinforces brand identity but also enhances the overall aesthetics of the chair. The handle's curvature allows for creative and eye-catching logo placement, making it more noticeable and memorable to users and visitors. The curved surface of the handle 30 may provide an opportunity to display text or patterns in a visually pleasing manner. Company names, taglines, or inspirational quotes can be printed or engraved along the curve, utilizing the handle's shape as a canvas. The curvature adds a dynamic element to the customization, making the text or pattern appear more interesting and engaging. Additionally, patterns or designs that follow the handle's curve can create a harmonious and flowing visual effect, enhancing the overall appeal of the chair. The curvature of the handle 30 can also be utilized to accentuate brand colors. By applying the brand's signature colors along the curve, it creates a visually striking effect. The handle 30 becomes a focal point that draws attention, highlighting the brand's identity and creating a cohesive design language. This color accentuation can contribute to a stronger brand association, as users and visitors associate the distinctive colors with the organization or business. It also adds a touch of vibrancy and personality to the chair's overall appearance.

Chair 10 can incorporate structural reinforcements to ensure that the weight of the handle 30 does not compromise stability of the chair 10. Engineering techniques, such as strengthening the connection points between the handle 30 and the seat back 14, or integrating additional support structures, can be employed to distribute the weight effectively. By reinforcing critical areas of the chair 10, it becomes more resistant to potential issues related to the handle's weight, albeit relatively light compared to the chair, thereby maintaining stability and performance.

As described herein, aspects of the present disclosure may include one or more electrical, pneumatic, hydraulic, or other similar secondary components and/or systems therein. The present disclosure is therefore contemplated and will be understood to include any necessary operational components thereof. For example, electrical components will be understood to include any suitable and necessary wiring, fuses, or the like for normal operation thereof (if the handle is used on a lighted or illuminated chair). Similarly, any pneumatic systems provided may include any secondary or peripheral components such as air hoses, compressors, valves, meters, or the like. It will be further understood that any connections between various components not explicitly described herein may be made through any suitable means including mechanical fasteners, or more permanent attachment means, such as welding or the like. Alternatively, where feasible and/or desirable, various components of the present disclosure may be integrally formed as a single unit.

Having thus described the exemplary features and advantages of chair 10, reference is now made to the operational efforts of a user to move the chair 10 utilizing handle 30. One exemplary method for moving the chair 10 with the vertically oriented handle 30 takes into consideration the ergonomic benefits and the centralized center of gravity. In this method, a user may approach the chair. The user may stand behind (rearward of the rear surface 26 of seat back 14) of the chair 10. The user will position their hand on the handle 30 by inserting their fingers through the aperture 78 and grasp the second portion 70. This is typically done with the user's dominant hand on the vertically oriented handle 30, thereby ensuring a secure grip. The handle 30 should be positioned at a comfortable height, allowing your wrist to remain in a slightly extended, neutral position. If the handle is too high or too low, it may be advantageous to provide the base 40 with a gas or pneumatic piston to allow the chair to be raised or lowered to a more ergonomic height for movement. Before moving the chair, the user should try to engage proper body mechanics, such that before initiating the movement, the user should try to remember to maintain proper body mechanics to reduce strain and maximize efficiency. This would typically include keeping the user's back straight and engaging the user's core muscles for stability. The user should try to avoid leaning or twisting their body while moving the chair 10.

The user may either drag the chair 10 or lift the chair 10 while grasping and pulling the handle 30. When dragging the chair 10 by the handle, the user can begin moving it in the desired direction. The centralized center of gravity, along with the ergonomic handle position, allows for better balance and control during the dragging movement. The dragging movement can including either or both of a pushing movement or a pulling movement. For example, the user can push or pull the chair smoothly, using the handle 30 as a guide. When lifting the chair 10 with handle 30, the user may lift the chair 10 slightly off the ground. As the user lifts, the user should maintain a firm grip on the handle 30, ensuring that the user's wrist remains in a neutral position.

While moving the chair, the user should be mindful of their surroundings and any obstacles in their path. The user should ensure that they have sufficient space to maneuver safely, especially in crowded environments, and make any necessary adjustments to avoid collisions or potential hazards.

When the user has reached the desired location for the desired placement of the chair, the user should maintain a firm grip on the handle 30 until the chair 10 is stable and resting securely on the floor.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, although handle 30 is should throughout the figures in conjunction with chair 10, handle 30 may be provided (as described in the appended claims) separately from chair and could be utilized on different types of chairs. For example, handle 30 may be provided or solid individually to allow the user to install handle on regular chairs, stools, barstools, folding chairs, or mobility aids (i.e., wheelchairs).

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

While components of the present disclosure are described herein in relation to each other, it is possible for one of the components disclosed herein to include inventive subject matter, if claimed alone or used alone. In keeping with the above example, if the disclosed embodiments teach the features of A and B, then there may be inventive subject matter in the combination of A and B, A alone, or B alone, unless otherwise stated herein.

As used herein in the specification and in the claims, the term "effecting" or a phrase or claim element beginning with the term "effecting" should be understood to mean to cause something to happen or to bring something about. For example, effecting an event to occur may be caused by actions of a first party even though a second party actually performed the event or had the event occur to the second party. Stated otherwise, effecting refers to one party giving another party the tools, objects, or resources to cause an event to occur. Thus, in this example a claim element of "effecting an event to occur" would mean that a first party is giving a second party the tools or resources needed for the second party to perform the event, however the affirmative single action is the responsibility of the first party to provide the tools or resources to cause said event to occur.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

To the extent that the present disclosure has utilized the term "invention" in various titles or sections of this specification, this term was included as required by the formatting requirements of word document submissions pursuant the guidelines/requirements of the United States Patent and Trademark Office and shall not, in any manner, be considered a disavowal of any subject matter.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed is:

1. A chair comprising:

a seat adapted to be sit upon;

a seat back having an upper end and a lower end defining a vertical direction therebetween, the seat back having a first side and a second side defining a lateral direction therebetween, and the seat back having a front surface and a rear surface defining a transverse direction therebetween;

a handle on the rear surface of the seat back, wherein the handle includes a length dimension that is oriented in the vertical direction, a width dimension that is oriented in the lateral direction, a thickness that is oriented in the transverse direction, and the handle including a first end of the handle and a second end of the handle, the first end of the handle and the second end of the handle being located along the length dimension of the handle; and wherein the length of the handle is a maximum dimension of the handle, the length of the handle being vertically oriented on the rear surface of the seat back, the first end of the handle and the second end of the handle are both connected to the rear surface of the seat back; and wherein the handle is configured to facilitate at least one of moving or rearranging of the chair from one location to another.

2. The chair of claim 1, further comprising:

an imaginary vertical centerline of the seat back that is located centrally between the first side and the second side of the seat back; and wherein the length of the handle is centrally-aligned on the seat back relative to the vertical centerline.

3. The chair of claim 1, further comprising:

a bar that extends from the first end of the handle to the second end of the handle, wherein the first end of the handle is vertically above the second end of the handle such that the bar is vertically oriented.

4. The chair of claim 3, further comprising:

wherein a portion of the bar between the first end of the handle and the second end of the handle is spaced apart from the rear surface of the seat back to at least partially define an aperture between the portion of the bar and the rear surface of the seat back.

5. The chair of claim 4, wherein the portion of the bar that is spaced apart from the rear surface of the seat back is curved.

6. The chair of claim 1, wherein the handle comprises:

an upper portion;

a first portion and a second portion, wherein the first portion and the second portion are located vertically below the upper portion; and a lower portion, wherein the lower portion is located vertically below the first portion and the second portion.

7. The chair of claim 6, wherein the handle further comprises:

an aperture defined between the first portion and the second portion, wherein the aperture extends through the handle in the lateral direction.

8. The chair of claim 7, wherein the handle further comprises:

a downwardly facing upper concave edge between the first portion and the second portion; and an upwardly facing lower concave edge between the first portion and the second portion, wherein the lower concave edge is below the upper concave edge.

9. The chair of claim 8, wherein the handle further comprises:

an aperture first edge on the first portion;

an aperture second edge on the second portion; and wherein the aperture is defined by the aperture first edge, the aperture second edge, the downwardly facing upper concave edge, and the upwardly facing lower concave edge.

10. The chair of claim 8, wherein the handle further comprises:

a radius of curvature of the downwardly facing upper concave edge that is greater than a radius of curvature of the upwardly facing lower concave edge.

11. The chair of claim 8, wherein the radius of curvature of the downwardly facing upper concave edge is approximately three times greater than the radius of curvature of the upwardly facing lower concave edge.

12. The chair of claim 8, wherein the handle further comprises:

an apex of the downwardly facing upper concave edge;

a nadir of the upwardly facing lower concave edge; and a vertically oriented length of the aperture measured from the apex to the nadir, wherein the vertically oriented length of the aperture is in a range from about 5 inches to about 10 inches.

13. The chair of claim 6, wherein the handle further comprises:

a thickness dimension of the first portion that is measured in the transverse direction; and a thickness dimension of the second portion that is measured in the transverse direction; wherein the thickness dimension of first portion is greater than the thickness dimension of the second portion.

14. The chair of claim 1, wherein the length dimension of the handle is in a range from about 15 inches to about 30 inches, wherein the width dimension of the handle is in a range from about 0.5 inch to about 3 inches, and wherein the thickness dimension of the handle is in a range from about 1 inch to about 4 inches.

15. The chair of claim 1, wherein the handle is the only handle on the seat back of the chair, the handle being ergonomically configured to conform to a natural curve of a hand of a user and thereby to provide better support for the hand during the at least one of moving or rearranging of the chair.

16. A handle for a chair, the handle comprising:

an upper portion;

a first portion and a second portion, wherein the first portion and the second portion are located vertically below the upper portion;

a lower portion, wherein the lower portion is located vertically below the first portion and the second portion, the first portion, the second portion, the upper portion, and the lower portion of the handle together defining a length of the handle;

an aperture defined between the first portion and the second portion, wherein the aperture extends through the handle; and wherein the handle includes a first end and a second end, the handle being configured to be installed vertically on a chair such that, when the handle is installed vertically on the chair, a maximum length dimension of the handle is oriented substantially in a vertical direction, the first end and the second end of the handle are both located along the length dimension of the handle and are both connected to a rear surface of the seat, and the aperture extends through the handle in a lateral direction; and wherein the handle is ergonomically configured to conform to a natural curve of a hand of a user and thereby to provide better support for the hand during the at least one of moving or rearranging of the chair.

17. The handle of claim 16, further comprising:

a downwardly facing upper concave edge between the first portion and the second portion; and an upwardly facing lower concave edge between the first portion and the second portion, wherein the lower concave edge is below the upper concave edge.

18. The handle of claim 17, further comprising:

an aperture first edge on the first portion;

an aperture second edge on the second portion; and wherein the aperture is defined by the aperture first edge, the aperture second edge, the downwardly facing upper concave edge, and the upwardly facing lower concave edge.

19. The handle of claim 18, further comprising:

a radius of curvature of the downwardly facing upper concave edge that is greater than a radius of curvature of the upwardly facing lower concave edge.

20. The handle of claim 19, wherein the radius of curvature of the downwardly facing upper concave edge is approximately three times greater than the radius of curvature of the upwardly facing lower concave edge.

21. A chair comprising:

a seat adapted to be sit upon, the seat defining a seat upper edge;

a seat back having an upper end and a lower end defining a vertical direction therebetween, the seat back having a first side and a second side defining a lateral direction therebetween, and the seat back having a front surface and a rear surface defining a transverse direction therebetween;

a handle on the rear surface of the seat back, the handle positioned fully below the seat upper edge, wherein the handle includes a length dimension that is oriented in the vertical direction, a width dimension that is oriented in the lateral direction, a thickness that is oriented in the transverse direction, and the handle including a first end of the handle and a second end of the handle, the first end of the handle and the second end of the handle being located along the length dimension of the handle; and wherein the length of the handle is a maximum dimension of the handle, the length of the handle being vertically oriented on the rear surface of the seat back, the first end of the handle and the second end of the handle are both connected to the rear surface of the seat back; and wherein the handle is configured to facilitate at least one of moving or rearranging of the chair from one location to another.

* * * * *